(12) United States Patent
Lee et al.

(10) Patent No.: US 9,669,763 B2
(45) Date of Patent: Jun. 6, 2017

(54) REAR-VIEW MIRROR ASSEMBLY FOR VEHICLE

(71) Applicants: HYUNDAI MOTOR COMPANY, Seoul (KR); KIA MOTORS CORPORATION, Seoul (KR)

(72) Inventors: Jin Hee Lee, Seoul (KR); Hyun Sub Kim, Seoul (KR); Bo Keun Kim, Anyang-si (KR); Nak Kyoung Kong, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/862,113

(22) Filed: Sep. 22, 2015

(65) Prior Publication Data

US 2016/0121797 A1 May 5, 2016

(30) Foreign Application Priority Data

Nov. 4, 2014 (KR) .......................... 10-2014-0152069

(51) Int. Cl.
*B60R 1/066* (2006.01)
*B60R 1/08* (2006.01)

(52) U.S. Cl.
CPC .................... *B60R 1/086* (2013.01)

(58) Field of Classification Search
None
See application file for complete search history.

(56) References Cited

U.S. PATENT DOCUMENTS

| 3,004,473 | A |   | 10/1961 | Arthur et al. |
|---|---|---|---|---|
| 3,026,771 | A |   | 3/1962 | Knowlton et al. |
| 3,279,315 | A | * | 10/1966 | Albers ................ B60R 1/086 359/606 |
| 3,472,580 | A |   | 10/1969 | Janosky |
| 3,522,987 | A | * | 8/1970 | Pflaum ................ B60R 1/086 359/606 |
| 4,278,227 | A | * | 7/1981 | Davis ................. B60R 1/064 248/487 |

(Continued)

FOREIGN PATENT DOCUMENTS

| GB | 757974 A | 9/1956 |
|---|---|---|
| JP | 2001-018718 A | 1/2001 |

(Continued)

*Primary Examiner* — Derek S Chapel
(74) *Attorney, Agent, or Firm* — McDermott Will & Emery LLP

(57) ABSTRACT

A rear-view mirror assembly for a vehicle includes a housing having an opening and a fixed reflector mounted to edges of the opening. A tilting reflector is disposed in the housing in parallel to the fixed reflector or inclined so that an upper end of the tilting reflector tilts rearward at an angle around a lower end of the tilting reflector to decrease light reflectance. A tilting plate has a front surface thereof attached to the tilting reflector and a lower end thereof mounted to a bottom surface of the housing. A tilting link is mounted between the tilting plate and the housing. A cam is mounted to the bottom surface of the housing to rotate the tilting link and comprises a link protrusion formed at a lower end of the tilting link and a tilting operating lever attached to a lower end of the cam.

10 Claims, 9 Drawing Sheets

(56) References Cited

U.S. PATENT DOCUMENTS 4,907,870 A * 3/1990 Brucker .................. B60R 1/025
359/875

FOREIGN PATENT DOCUMENTS

| JP | 2003-191791 A | 7/2003 |
|----|---------------|--------|
| KR | 20-0076614 | 12/1993 |
| KR | 2003-0040102 A | 5/2003 |

* cited by examiner

--Related Art --

--Related Art --

-- Related Art --

- DAY REFLECTION MODE -

- NIGHT REFLECTION MODE -

- DAY REFLECTION MODE -

- NIGHT REFLECTION MODE -

REAR-VIEW MIRROR ASSEMBLY FOR VEHICLE

CROSS-REFERENCE TO RELATED APPLICATION

This application claims under 35 U.S.C. §119(a) the benefit of priority to the Korean Patent Application No. 10-2014-0152069 filed on Nov. 4, 2014, the entire content of which is incorporated herein by reference.

TECHNICAL FIELD

The present disclosure relates to a rear-view mirror assembly for a vehicle. More particularly, the present disclosure relates to a rear-view mirror assembly for a vehicle that can prevent foreign substances from penetrating inside the rear-view mirror assembly to contaminate a surface of a tilting reflector.

BACKGROUND

A vehicle has a rear-view mirror therein to provide a rear-seat view and a rear view for a driver and, which is tiltably mounted on a ceiling located above a driver's seat and a passenger's seat.

A rear-view mirror assembly comprises a housing assembled onto the ceiling surface by a ball joint and mirror glass mounted on a front surface of the housing.

The mirror glass in the vehicle typically has a flat reflection surface with a predetermined thickness. A headlight, particularly a full beam, of a vehicle behind the driver is reflected to the mirror glass, thereby causing a glare to a driver.

To prevent the reflection from the mirror glass, a frameless rear-view mirror assembly has been introduced, which controls light reflectance.

A frameless rear-view mirror assembly in the related art will be described below with reference to FIGS. 1 to 3. Referring to FIGS. 1 and 2, a frameless prism glass 20 is mounted to a front opening of a housing 10. The prism glass 20 has a thickness which gradually decreases from top to bottom.

In this case, the housing 10 is tiltably mounted by a ball joint 12, and a lever 14 for controlling an angle of the housing 10 is connected to the ball joint 12. A front surface of the prism glass 20 includes a first reflection surface 21 that implements a night reflection mode. A rear surface of the prism glass 20 includes a second reflection surface 22 which is coated with a reflection material that implements a day reflection mode.

As illustrated in FIG. 2, in the day reflection mode, a rear object and light are reflected through the second reflection surface 22 of the prism glass 20, and thus, a driver can view the rear object reflected from the second reflection surface 22, and simultaneously, the light reflected on the second reflection surface 22 is introduced into eyes of the driver.

When the lever 14 is rotated downward around the ball joint 12 to tilt the housing 10 upward (approximately 3.5°) in order to decrease the light reflection in the night reflection mode, the prism glass 20 also tilts at the same angle together with the housing 10, and thus, the rear object and light are reflected through the first reflection surface 21.

As described above, in the night reflection mode, a reflection angle is controlled by tilting the prism glass 20, and as a result, the light introduced from the rear object (in particular, headlight of the rear vehicle) is reflected through the first reflection surface 21 while reflectance decreases. Consequently, a glare to the driver can be prevented.

However, according to the rear-view mirror assembly of the related art, when the rear object is reflected through the first and second reflection surfaces of the prism glass in the day reflection mode and the night reflection mode, a virtual image and a real image overlap with each other due to the characteristic of the prism glass, and therefore, a driver may recognize the rear object, but may feel uncomfortable.

In order to solve the above problem, various studies to reduce image overlapping have been introduced, for example, a vehicle rear-view mirror assembly as shown in FIG. 3 comprises a fixed reflector fixed to a rear-view mirror housing. A tilting reflector is arranged on a rear surface of the fixed reflector in a day reflection mode, and simultaneously, tilting in a night reflection mode. Here, a virtual image and a real image overlap with each other in the day reflection mode. A tilting trajectory of the tilting reflector for switching between the day reflection mode and the night reflection mode, is maintained to intuitively recognize a state of a reflection mode.

However, as illustrated in FIG. 3, a gap between a lever for tilting the tilting reflector and a slot formed on the bottom of the housing is formed, dust and foreign substances may penetrate into the inside of the housing from outside through the gap (the arrow in FIG. 3 indicates a penetration direction), and consequently, the penetrated dust and the like adhere onto the tilting reflector, thus deteriorating reflection performance of the tilting reflector.

The above information disclosed in this Background section is only for enhancement of understanding of the background of the disclosure, and therefore, it may contain information that does not form the prior art that is already known in this country to a person of ordinary skill in the art.

SUMMARY OF THE DISCLOSURE

The present disclosure has been made in an effort to solve the above-described problems associated with prior art and to provide an rear-view mirror assembly for a vehicle having a lever for angularly rotating a tilting reflector to prevent foreign substances such as dust and the like from entering.

According to an embodiment of the present disclosure, a rear-view mirror assembly for a vehicle includes a housing ball-joined onto a ceiling of an interior of the vehicle and having an opening at one side. A fixed reflector is fixedly mounted onto a periphery of the housing at the opened side. A tilting reflector is tiltably disposed inside the housing. The tiling reflector is disposed in parallel to a rear surface of the fixed reflector in a day reflection mode or inclined so that an upper end of the tilting reflector tilts rearward at an angle around a lower end of the tilting reflector to decrease light reflectance in a night reflection mode. A tilting plate has a front surface attached to a rear surface of the tilting reflector and a lower end of the tilting plate is rotatably mounted to a bottom surface of the housing. A tilting link is rotatably mounted between a rear surface of the tilting plate and an inner wall surface of the housing to tilt the tilting plate. A cam is rotatably and sealably mounted to the bottom surface of the housing to rotate the tilting link back and forth, and comprises a link protrusion formed at a lower end of the tilting link and a tilting operating lever attached to a lower end of the cam and extending to outside through a through-hole formed on the bottom surface of the housing.

The cam may have a fan shape and is mounted to the bottom surface of the housing to rotate left and right.

A diagonal guide groove may be formed on an outer diameter surface of the cam, into which the link protrusion is inserted to move back and forth.

A sealing block seals the interior of the housing together with the cam and guides an angular rotation trajectory of the cam.

The sealing block may be integrally mounted to the bottom surface of the housing, and the cam is covered by a sealing casing.

According to the rear-view mirror assembly of the present disclosure, a cam having a structure in which a link protrusion formed at a lower end of a tilting link in the housing is mounted on the bottom surface of the housing to rotate and be sealed so as to easily prevent the foreign substances such as dust and the like from penetrating the inside of the housing.

Further, the lower end of the tilting link moves back and forth along a diagonal guide groove formed in the cam by operating a tilting lever integrally formed at a lower end of the cam right and left, and as a result, a forward-backward reflection angle of the tilting reflector can be easily controlled by rotating a tilting plate back and forth together with the tilting link.

The above and other features of the invention are discussed infra.

BRIEF DESCRIPTION OF THE DRAWINGS

The above and other features of the present disclosure will now be described in detail with reference to an exemplary embodiment thereof illustrated by the accompanying drawings which are given hereinbelow by way of illustration only, and thus are not limitative of the present disclosure.

Figure 1:
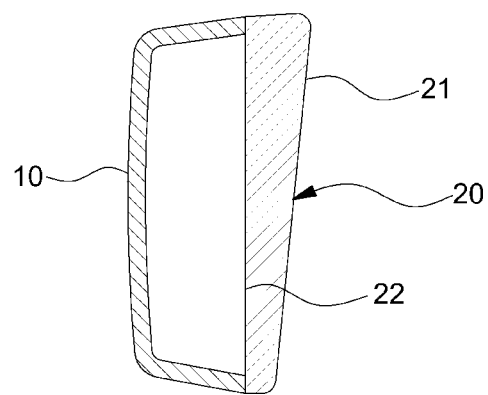
FIGS. 1 and 2 are diagrams illustrating a rear-view mirror assembly according to one example in the related art.
Figure 2:
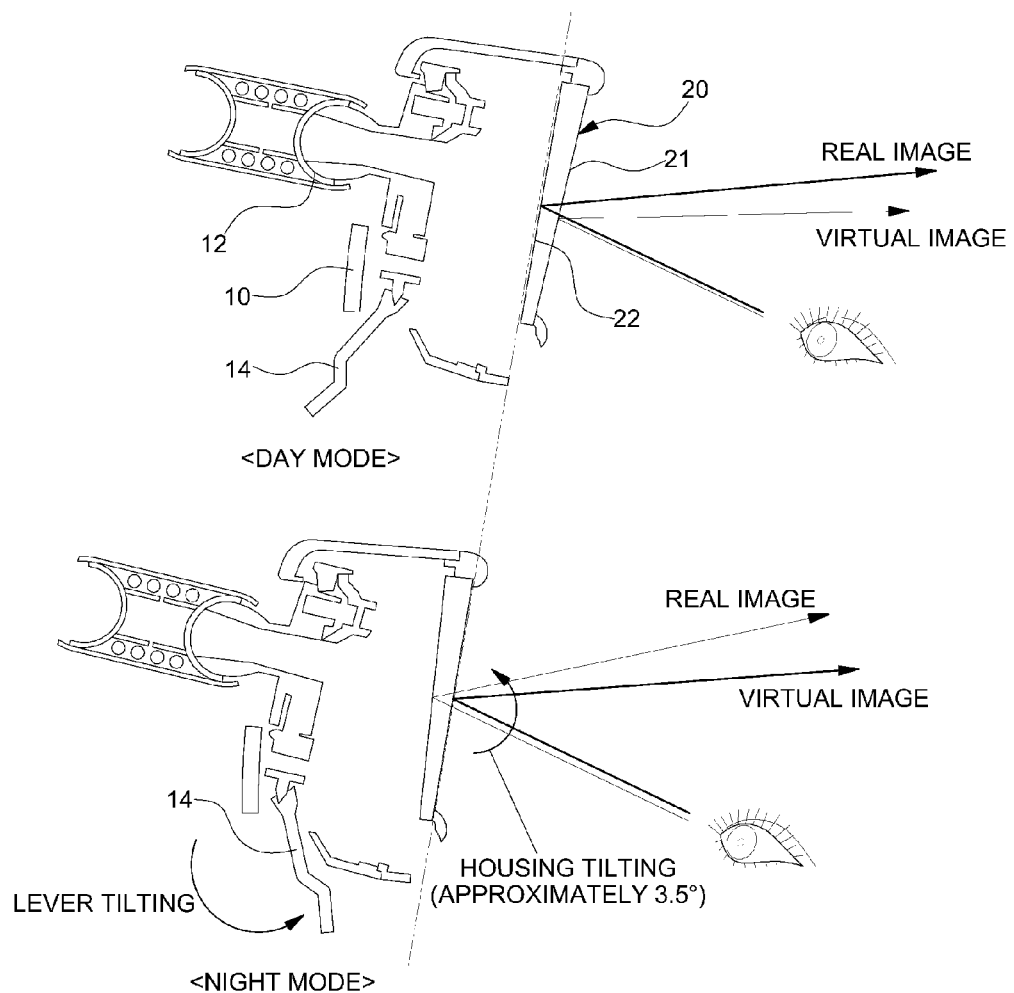
Figure 3:
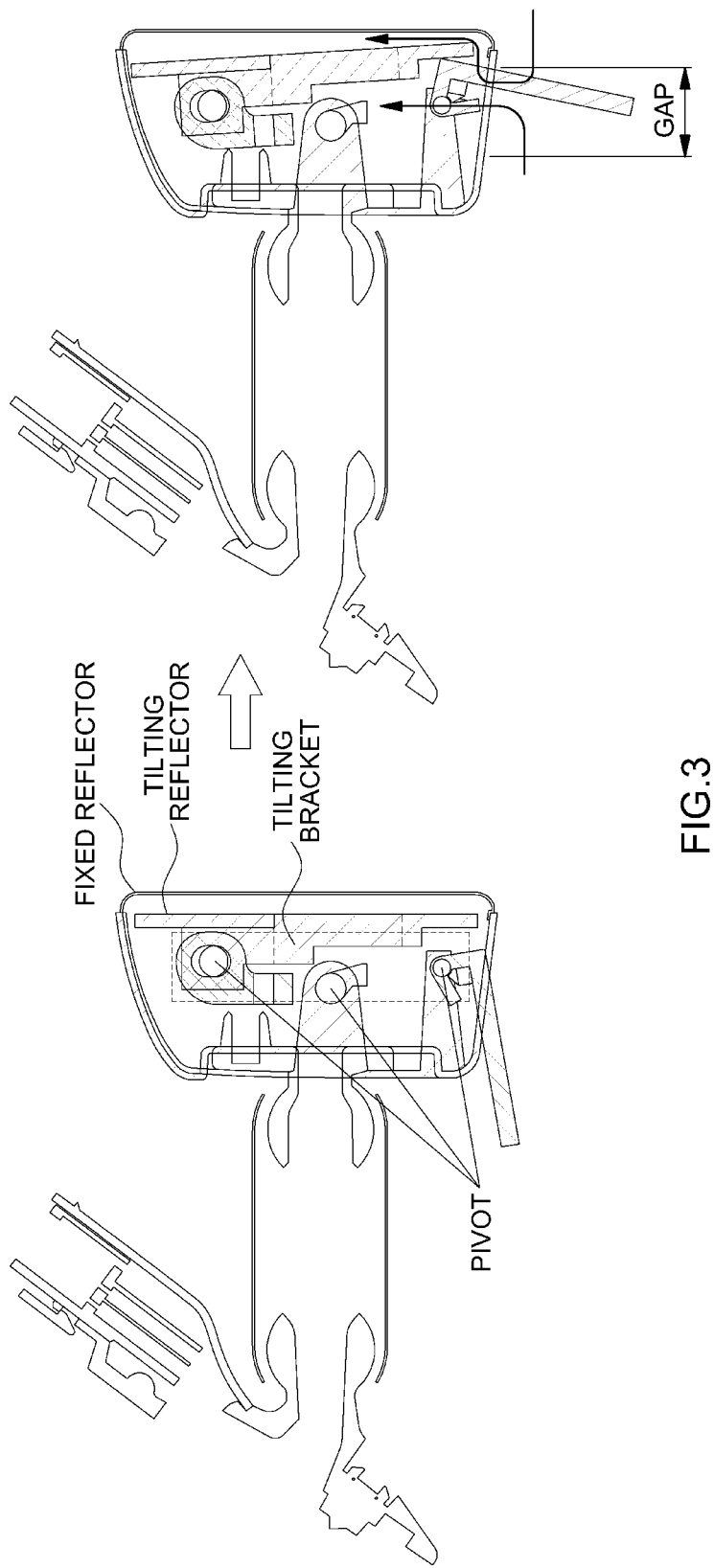
FIG. 3 is a cross-sectional view illustrating a rear-view mirror assembly according to another example in the related art.

It should be understood that the appended drawings are not necessarily to scale, presenting a somewhat simplified representation of various features illustrative of the basic principles of the disclosure. The specific design features of the present invention as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to an embodiment of the present inventive concept, examples of which are illustrated in the accompanying drawings and described below. While the disclosure will be described in conjunction with the exemplary embodiment, it will be understood that present description is not intended to limit the invention to the exemplary embodiment. On the contrary, the inventive concept is intended to cover not only the exemplary embodiment, but also various alternatives, modifications, equivalents, and other embodiments, which may be included within the spirit and scope of the disclosure as defined by the appended claims.

It is understood that the term "vehicle" or "vehicular" or other similar term as used herein is inclusive of motor vehicles in general such as passenger automobiles including: sports utility vehicles (SUV), buses, trucks, various commercial vehicles, watercraft including; a variety of boats and ships, aircraft, and the like, and includes; hybrid vehicles, electric vehicles, plug-in hybrid electric vehicles, hydrogen-powered vehicles, and other alternative fuel vehicles (for example, fuels derived from resources other than petroleum). As referred to herein, a hybrid vehicle is a vehicle that has two or more sources of power, for example both gasoline-powered and electric-powered vehicles.

Hereinafter, an embodiment of the present disclosure will be described in detail with reference to the accompanying drawings.

The present disclosure discloses a rear-view mirror assembly that allows only a real image be clearly viewed without a virtual image of a rear object through a rear-view mirror in day (daytime) driving and may prevent dazzling of a driver by decreasing reflectance of light (for example, a headlight of a rear vehicle) introduced from the rear in night (nighttime) driving, and in particular, prevents foreign substances such as dust and the like from penetrating into an interior of a mirror housing.

Figure 4:
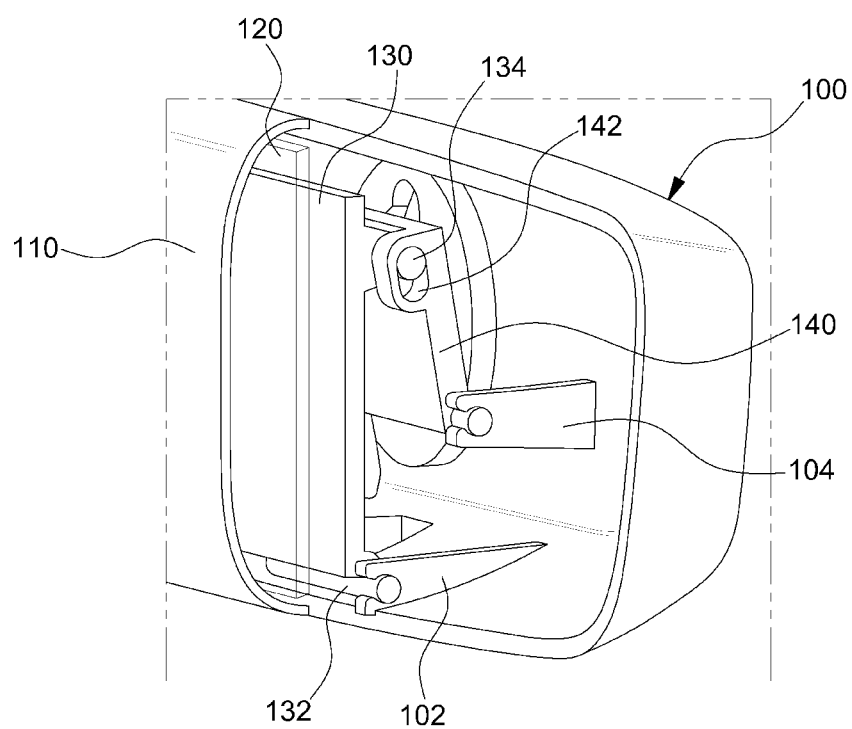
FIG. 4 is a cross-sectional perspective view illustrating a rear-view mirror assembly according to the present disclosure.
Figure 5A:
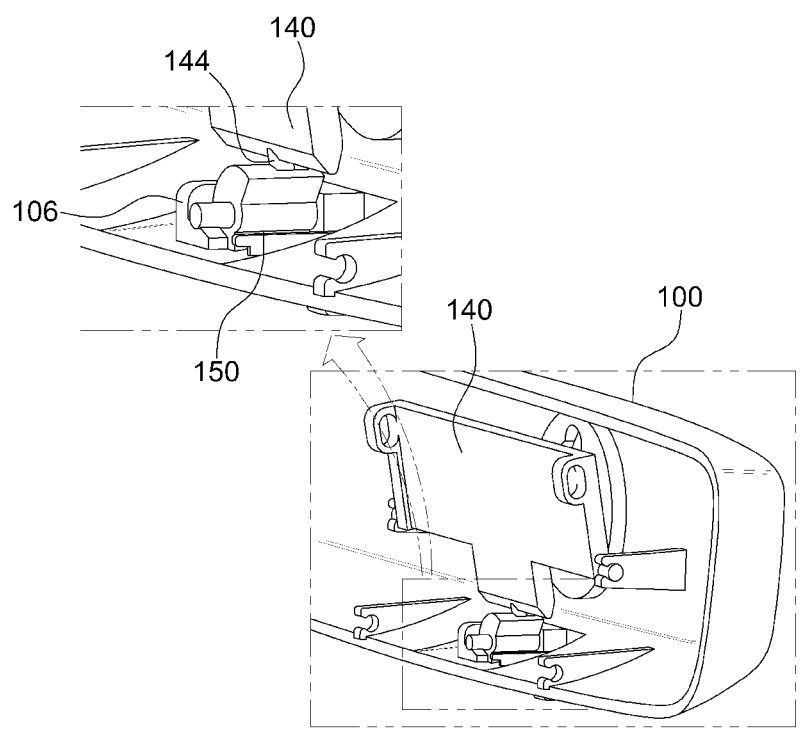
FIGS. 5A and 5B are perspective views illustrating a state in which a tilting reflector and a tilting plate of the rear-view mirror assembly are excluded according to the present disclosure.
Figure 5B:
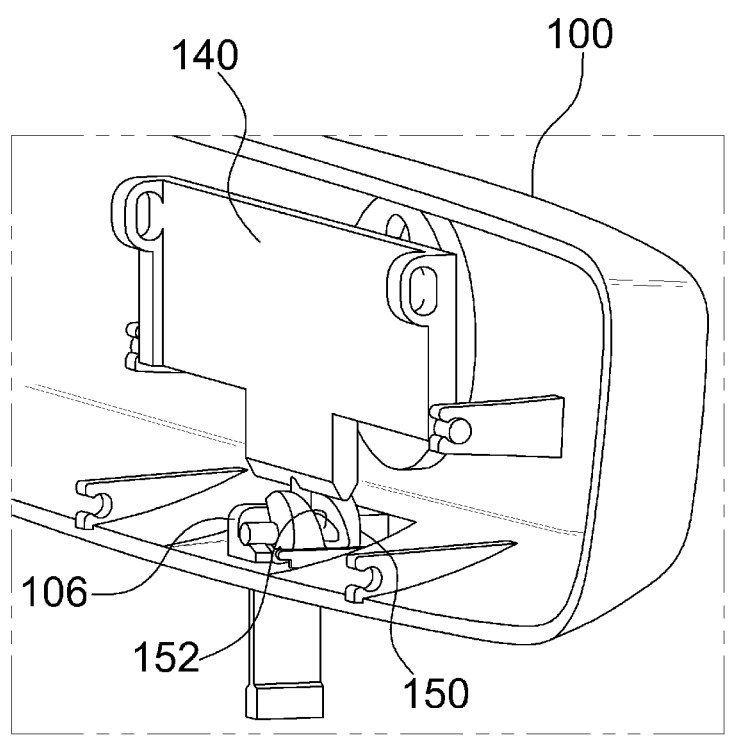

FIG. 4 is a cross-sectional perspective view illustrating a rear-view mirror assembly according to the present disclosure. FIGS. 5A and 5B are perspective view illustrating a state in which a tilting reflector and a tilting plate of the rear-view mirror assembly are excluded according to the present disclosure.

Referring to FIGS. 4 and 5, a mirror housing 100 of a rear-view mirror assembly is ball-joined onto a ceiling between a driver's side and a passenger's side. The housing 100 has a front surface which is open.

A transparent fixed reflector 110 is fixed and mounted onto a front opening of the housing 100. The fixed reflector 110 is formed of a transparent plastic material and has a curved surface by an edge thereof being bent rearward toward the housing 100. The housing 100 and the fixed reflector 110 are integrally joined at the front opening of the housing 100 by attaching the edge of the fixed reflector to a periphery of the housing 100 to form a frameless structure.

A tilting reflector 120 is tiltably disposed in the housing 100. In particular, the tilting reflector 120 is formed of a plastic material coated with a reflection material. The tilting reflector 120 reflects a rear object for a driver to substantially view the rear object.

Therefore, the tilting reflector 120 is arranged in parallel to a rear surface of the fixed reflector 110 in a day reflection mode. In a night reflection mode, an upper end of the tilting reflector 120 tilts rearward at an angle around a lower end thereof in order to decrease light reflectivity.

The rear-view mirror assembly according to the present disclosure further comprises a tilting operating mechanism provided inside and outside the housing 100 and connected with the tilting reflector 120 to control the tilting angle of the tilting reflector 120.

In one configuration of the tilting operating mechanism, a tilting plate 130 is integrally attached to a rear surface of the tilting reflector 120. When the tilting plate 130 tilts, the tilting reflector 120 also tilts at the same angle. Hinge pins 132 are disposed on both sides of a lower end of the tilting plate 130. The hinge pins 132 are hinge-coupled to a first hinge terminal 102 formed on a bottom surface of the housing 100, and therefore, an upper end of the tilting plate 130 angularly rotates around the hinge pins 132. A tilting link 140 is connected to the rear surface of the tilting plate 130 so as to angularly rotate the tilting plate 130 at a predetermined angle. A pivot shaft 134 is disposed at an upper portion of the rear surface of the tilting plate 130 and inserted into a slot 142 formed at an upper end of the tilting link 140. A lower end of the tilting link 140 is hinge-coupled to a second hinge terminal 104 formed on an inner wall surface of the housing 100.

Figure 7:
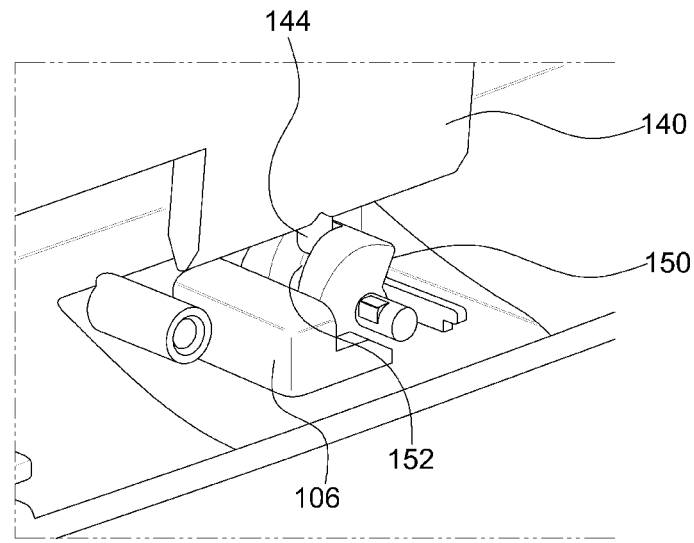
FIG. 7 is a perspective view illustrating a connection structure between the cam and a tilting link of the rear-view mirror assembly according to the present disclosure.
Figure 8:
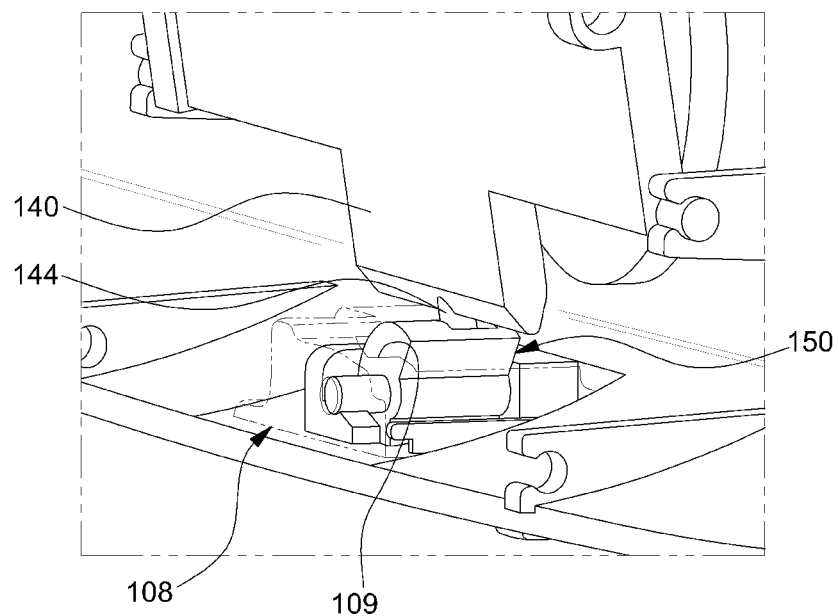
FIG. 8 is a perspective view illustrating a sealing casing structure of the rear-view mirror assembly according to the present disclosure.

Herein, a cam 150 is connected to the lower end of the tilting link 140 as a means for angularly rotating the tilting link 140 back and forth. The cam 150 is rotatably and sealably mounted on the bottom surface of the housing 100. The cam 150 may have a fan shape as seen in FIGS. 5A, 5B, and 7. The cam 150 comprises a diagonal guide groove 152 formed on an outer-diameter surface of the cam 150 so as to move back and forth, into which a link protrusion 144 is inserted. A tilting operating lever 154 that extends to outside through a through-hole formed on the bottom surface of the housing 10 is integrally formed at a lower end of the cam 150.

In addition, the housing 100 has a sealing block 106, which seals the inside of the housing 100, disposed on the bottom surface of the housing 100 together with the surface of the cam 150 in order to guide an angular rotation trajectory of the cam 150. In more detail, the sealing block 106 is integrally disposed around the through-hole formed on the bottom surface of the housing 100 through which the tilting operating lever 154 passes, and the sealing block 106 covers a periphery of the cam 150.

Accordingly, when the cam 150 angularly rotates, there is no gap formed between the cam 150 and the sealing block 106, and thus, foreign substances such as dust and the like cannot penetrate the inside of the housing 100.

A sealing casing 108 that covers the cam 150 and the sealing block 106 is further integrally formed on the bottom surface of the housing 100. The sealing casing 108 covers the cam 150 and the sealing block 106 within a range in which rotational interference of the cam 150 does not occur to better prevent the foreign substances from penetrating the inside of the housing 100.

In this case, a slot 109 is formed on the top of the sealing casing 108 so as to expose the diagonal guide groove 152 of the cam 150 outside. The link protrusion 144 of the tilting link 140 may be inserted into the diagonal guide groove 152 to be transportable.

Herein, an operation of the rear-view mirror assembly of the present disclosure configured as above will be described below.

Day Reflection Mode

Referring to FIG. 5A, in the day reflection mode, the tilting reflector 120 is arranged on the rear surface of the transparent fixed reflector 110 which is mounted parallel to the front opening of the housing 100 to illuminate only a real image without a virtual image when a rear object is illuminated onto the tilting reflector 120, thereby providing a clear rear view to the driver.

Here, when the tilting operating lever 154 angularly rotates to one side, the cam 150 rotates simultaneously.

Figure 6A:
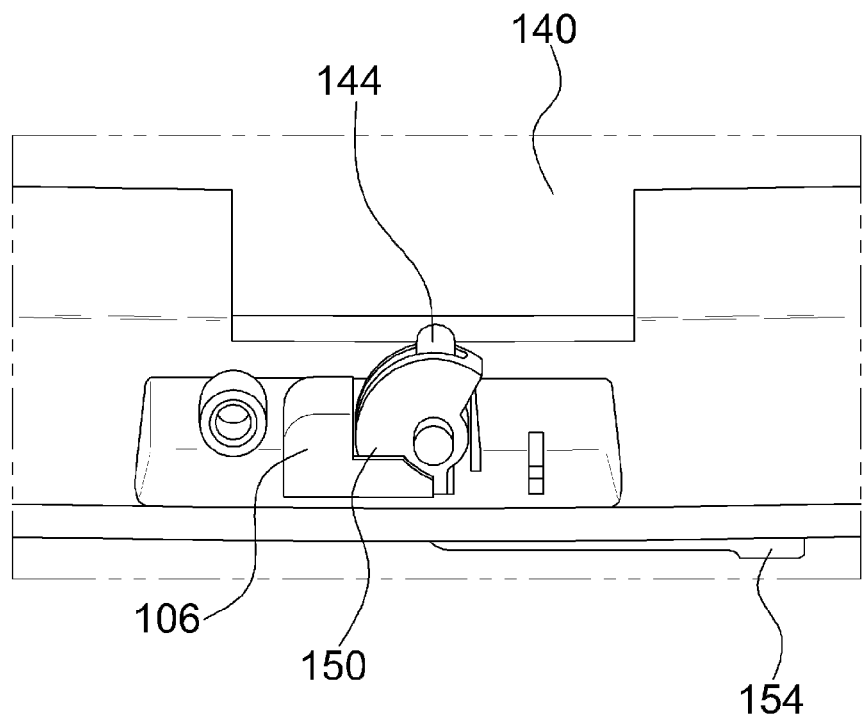
FIGS. 6A and 6B are perspective views illustrating an angular rotating operation for a cam of the rear-view mirror assembly according to the present disclosure.

Referring to FIGS. 5A and 6A, an upper end of the tilting link 140 is inclined forward as the link protrusion 144 of the tilting link 140 inserted into the diagonal guide groove 152 moves toward one end of the diagonal guide groove 152.

Therefore, the tilting reflector 120 joined with the tilting plate 130 is arranged in parallel to the rear surface of the fixed reflector 110 when the tilting plate 130 is vertically arranged because the tilting link 140 pushes an upper end of the tilting plate 130 forward.

As described above, in the day reflection mode, the tilting reflector 120 is arranged on the rear surface of the transparent fixed reflector 110 mounted parallel to the front opening of the housing 100, and as a result, since only the real image of the rear object is reflected without the virtual image, the driver may clearly view the rear object.

When the cam 150 angularly rotates to be in the day reflection mode, since there is no gap formed between a surface of the cam 150 and the sealing block 106, the foreign substances cannot penetrate the inside of the housing 100. In addition, since the cam 150 and the sealing block 106 are covered by the sealing casing 108, the foreign substances can be prevented from penetrating the inside of the housing 100.

Night Reflection Mode

In the night reflection mode, the tilting reflector 120 tilts from the fixed reflector 110 rearward at a predetermined angle to prevent dazzling of the driver by decreasing reflectance of light (for example, a headlight of a rear vehicle) from the tilting reflector 120.

In the night reflection mode, the tilting operating lever 154 in the day reflection mode is angularly rotated in a reverse direction.

Figure 6B:
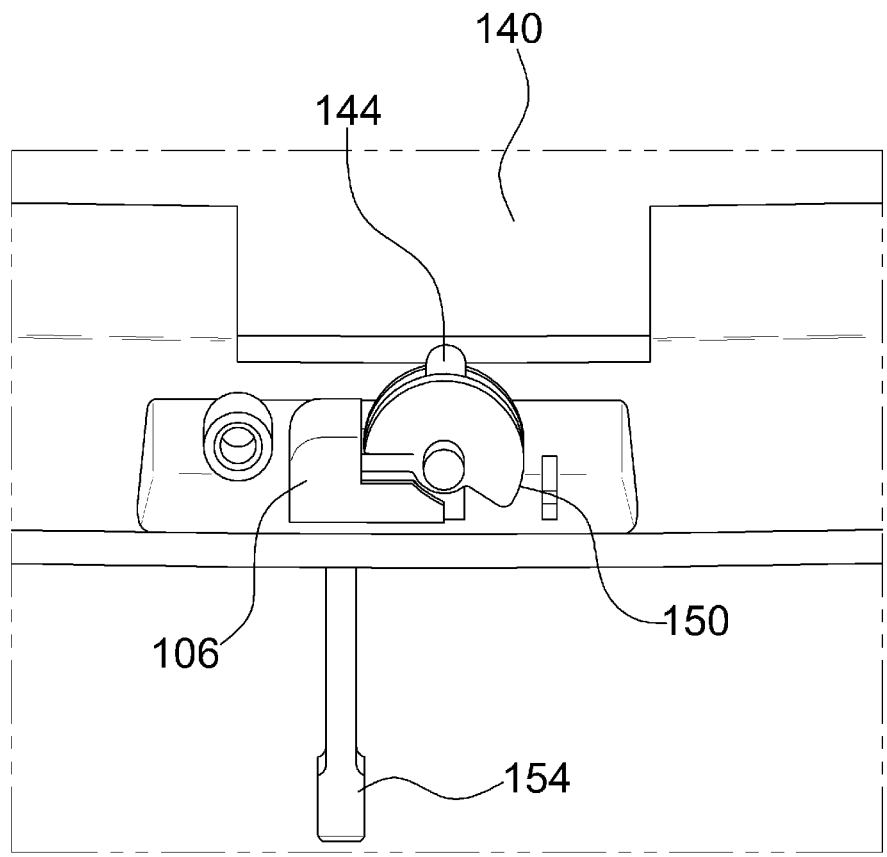

Referring to FIGS. 5B and 6B, when the link protrusion 144 inserted into the diagonal guide groove 152 of the cam 150 moves to another end of the diagonal guide groove 152, the upper end of the tilting link 140 rotates rearward.

Therefore, the upper end of the tilting reflector 120 joined with the tilting plate 130 is inclined from the rear surface of the fixed reflector 110 at a predetermined angle because the tilting link 140 pushes the upper end of the tilting plate 130 rearward.

As described above, the tilting reflector 120 joined with the tilting plate 130 tilts from the rear surface of the fixed reflector 110 to decrease reflectance of the light introduced from the rear.

Similarly, when the cam 150 rotates to be in the night reflection mode, since there is no gap formed between the surface of the cam 150 and the sealing block 106, the foreign substances cannot penetrate the inside of the housing 100. Furthermore, since the cam 150 and the sealing block 106 are covered by the sealing casing 108, the foreign substances can be prevented from penetrating into the inside of the housing 100.

The inventive concept has been described in detail with reference to an embodiment thereof. However, it will be appreciated by those skilled in the art that changes may be made in the embodiment without departing from the principles and spirit of the disclosure, the scope of which is defined in the appended claims and their equivalents.

What is claimed is:

1. A rear-view mirror assembly for a vehicle, comprising:
a housing ball-joined onto a ceiling of an interior of the vehicle and having an opening at one side;
a fixed reflector fixedly mounted onto a periphery of the housing at the opened side;
a tilting reflector tiltably disposed inside the housing, the tilting reflector disposed in parallel to a rear surface of the fixed reflector in a day reflection mode or inclined so that an upper end of the tilting reflector tilts rearward at an angle around a lower end of the tilting reflector to decrease light reflectance in a night reflection mode;

a tilting plate having a front surface attached to a rear surface of the tilting reflector and a lower end of the tilting plate rotatably mounted to a bottom surface of the housing; and a tilting link rotatably mounted between a rear surface of the tilting plate and an inner wall surface of the housing to tilt the tilting plate, wherein a cam is rotatably and sealably mounted to the bottom surface of the housing to rotate the tilting link back and forth, and comprises a link protrusion formed at a lower end of the tilting link and a tilting operating lever attached to a lower end of the cam and extending to outside through a through-hole formed on the bottom surface of the housing.

2. The assembly of claim 1, wherein the cam has a fan shape and is mounted to the bottom surface of the housing to rotate left and right.

3. The assembly of claim 1, wherein the cam has a diagonal guide groove formed on an outer diameter surface thereof, into which the link protrusion is inserted to move back and forth.

4. The assembly of claim 1, further comprising: a sealing block that seals an interior of the housing together with the cam and that guides an angular rotation trajectory of the cam.

5. The assembly of claim 4, wherein the sealing block is integrally mounted to the bottom surface of the housing, and the cam is covered by a sealing casing.

6. The assembly of claim 5, wherein a first slot that exposes the diagonal guide groove is formed on a top portion of the sealing casing.

7. The assembly of claim 1, wherein the fixed reflector is formed of a transparent plastic material and has a curved surface by an edge thereof being bent rearward toward the housing.

8. The assembly of claim 1, further comprising: hinge pins hinge-coupled to a first hinge terminal at the lower end of the tilting plate in which the first hinge terminal is fixed to the bottom surface of the housing.

9. The assembly of claim 1, further comprising: a pivot shaft disposed at an upper portion of the rear surface of the tilting plate.

10. The assembly of claim 9, wherein the pivot shaft is inserted into a second slot formed at an upper end of the tilting link, and the lower end of the tilting link is hinge-coupled to a second hinge terminal mounted on a middle portion of the inner wall surface of the housing.

\* \* \* \* \*